United States Patent
Meyer (10) Patent No.: US 10,725,990 B2
(45) Date of Patent: Jul. 28, 2020

(54) CO-PRIME HASHING

(71) Applicant: Facebook, Inc., Menlo Park, CA (US)

(72) Inventor: Alex Meyer, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 987 days.

(21) Appl. No.: 14/956,211

(22) Filed: Dec. 1, 2015

(65) Prior Publication Data
US 2017/0154042 A1    Jun. 1, 2017

(51) Int. Cl.
G06F 16/22        (2019.01)
G06F 16/901       (2019.01)

(52) U.S. Cl.
CPC ...... G06F 16/2255 (2019.01); G06F 16/9014 (2019.01)

(58) Field of Classification Search
CPC ........... G06F 17/3033; G06F 17/30949; G06F 15/00; G06F 17/30097; G06F 17/30424; G06F 17/30743; G06F 17/30758; G06F 12/0802; G06F 12/0864; G06F 12/1018; G06F 9/30098; G06F 16/2255; G06F 16/137; G06F 16/9014
See application file for complete search history.

(56) References Cited

U.S. PATENT DOCUMENTS

| | | | |
|---|---|---|---|
| 8,874,842 B1* | 10/2014 | Kimmel | G06F 3/0611 711/100 |
| 2006/0020796 A1* | 1/2006 | Aura | H04L 9/3236 713/168 |
| 2015/0039627 A1* | 2/2015 | Sen | G06F 16/2255 707/747 |
| 2015/0319149 A1* | 11/2015 | Alshammari | H04L 9/0869 713/171 |

OTHER PUBLICATIONS

Lecture 12: Creative Commons Attribution Non Commercial Share Alike 3.0 License; Jeff Erickson, pp. 1-12. (Year: 2013).*

* cited by examiner

*Primary Examiner* — James Trujillo
*Assistant Examiner* — Fatima P Mina
(74) *Attorney, Agent, or Firm* — FisherBroyles, LLP (57) ABSTRACT

A hashing system can use a set of multiple numbers that are co-prime to the size of a hash table to select a probe offset when collisions occur. Selecting a probe offset that is co-prime to the hash table size ensures that each hash table slot is available for any insert operation. Utilizing different co-prime numbers for different keys helps avoid clustering of items inserted into the hash table. When a collision occurs, the hashing system can compute a next index to check by selecting a probe offset that is located at a computed index on a list of numbers that are each co-prime to the number of slots in the hash table. The hashing system can compute the index into the list of numbers by applying a hash function to the data item and calculating a modulus of the result with respect to a count of the co-prime numbers list.

20 Claims, 6 Drawing Sheets

CO-PRIME HASHING

BACKGROUND

Since the beginning of the computing industry, efficient data storage and retrieval have been key concerns. As computing becomes more integrated into people's lives the amount of data gathered and stored is growing exponentially. Furthermore, this data is being gathered and used by ever smaller devices with limited storage space and processing power.

One data storage structure that computer scientists have developed to speed up data storage and retrieval is hash tables. Hash tables are data structures with multiple "slots" that can store data, each with an index value. A data item or a key identifying the data item can be "hashed" with a hash function. A hash function can take data of variable sizes or types and can return a consistently sized number. This number can be used to select an index on a hash table index. If the number is larger than the highest slot index, the modulus of the number can be calculated with respect to the size of the hash table to select the hash table index. When a retrieval operation for this data item needs to be performed, the data item can quickly be located by performing similar operations on the data item key to locate the index at which the data item was stored.

In some cases, a second data item key can hash to the same hash table index as a key for a data item already stored in the hash table. This can result in a collision. A "collision," as used herein, occurs (A) in a storage operation when another data item is already stored at an index computed for a data item or (B) in a retrieval operation when a data item being retrieved is not stored at an index computed for the data item. Algorithms for collision resolution have been developed such as separate chaining, Robin Hood hashing, and open addressing with various probing sequences such as linear probing and quadratic probing. These collisions occur because multiple data items may have keys that hash to the same or similar values (e.g. are clustered).

Although programs running on computing devices can store data to a storage device in a next available slot, when that data is retrieved the entire storage device may have to be searched to locate the data, significantly decreasing performance.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

A co-prime hashing system can implement hash tables that effectively utilize hash table space while avoiding clustering (described below in further detail). The co-prime hashing system can ensure that each slot in a hash table can be utilized by using probe offset values that are relatively prime to the size of the hash table. Two values are "co-prime" or "relatively prime" when the only positive integer that evenly divides both of values is 1, i.e. the only common positive factor of the two numbers is 1. When collisions occur, the co-prime hashing system can avoid clustering by selecting different co-prime probe offset values for different data keys.

The co-prime hashing system can generate an indexed list of numbers that are co-prime to the size of a hash table. As used herein, an indexed list of numbers that are co-prime to the size of a hash table is referred to as a "co-prime numbers list." The co-prime hashing system can, for example, generate this co-prime numbers list as part of establishing the hash table. In some implementations, the co-prime hashing system can compute numbers that are co-prime to the size of the hash table using the Euclidean algorithm.

When selecting a hash table slot for a data item, e.g., as part of inserting the data item into a hash table or as part of retrieving the data item from the hash table, the co-prime hashing system can compute a hash table slot index by applying a hash function to a key of the data item and calculating a modulus of the result with respect to a number of slots in the hash table. When a collision occurs at the computed index during an insert, or a data item being retrieved is not at the identified index during a retrieval, the co-prime hashing system can compute a next slot index to check by selecting a probe offset from the co-prime numbers list. The co-prime hashing system can compute the index of the co-prime number on the co-prime numbers lists by applying a second hash function to the key of the data item and computing a modulus of the result with respect to a number of items on the list of co-prime numbers list. During an insert operation, the co-prime hashing system can iteratively add the selected probe offset from the co-prime numbers list to the index location of the previous table slot index to select a next index until it locates an open slot or determines there are no open slots. During a retrieval operation, the co-prime hashing system can iteratively add the selected probe offset from the co-prime numbers list to the index location of the previous table slot index to select a next index until it locates the data item or determines that the data item is not in the hash table.

Employing a co-prime hashing system can improve the functioning of computing systems in which data is stored and retrieved using hash tables both by more effectively utilizing the amount of storage space available and by increasing the average storage and retrieval speed for data items. In particular, a co-prime hashing system can more effectively utilize the amount of storage space available by ensuring that all slots in a hash table are usable for any given insert operation. This improvement is realized due to the selection of a probe offset value that is co-prime to the size of the hash table. Otherwise, when a collision occurs, a hashing system could loop through next possible hash indexes and return to the original index, without first visiting all other indexes. Furthermore, this improvement can reduce the frequency of hash table resizing (creating a larger hash table and inserting all the items from the previous hash table into the new hash table), which can be one of the most computationally expensive and time-consuming procedures incurred when using hash tables. In addition, the co-prime hashing system can increase the average storage and retrieval speed for data items by selecting probe offsets that decrease the frequency of collisions. This improvement is realized due to the selection of different probe offset values for different data items. A common problem in prior art hash tables is "clustering," where data items map to similar hash values causing an increased amount of initial collisions and subsequent collisions after the addition of a probe offset. However, the co-prime hashing system can minimize clustering, which reduces the frequency of these subsequent collisions, by using different probe offset values for different data items. The co-prime hashing system tends to produce smaller clusters and therefore shorter sequences to probe, e.g. the co-prime hashing system can often fill more hash table slots before reaching inefficient clustering situations. This results in an increase in the average speed for hash table insertions and retrievals.

As used herein, references to using the "modulus" operation can include a check of whether the number that the modulus is being calculated of is smaller than the other number in the modulus operation and, where that check finds this to be the case, the smaller number can be used as the result without performing a standard modulus operation. For example, where x is less than y, x modulus y will always equal x, so implementations that refer to x modulus y can include determining that x is less than y and can simply use x as the result instead of actually performing a standard x modulus y operation. In some implementations, for values of y that are powers of two, x mod y can be computed as x AND (y−1) where AND is the bitwise-and operation.

Figure 1:
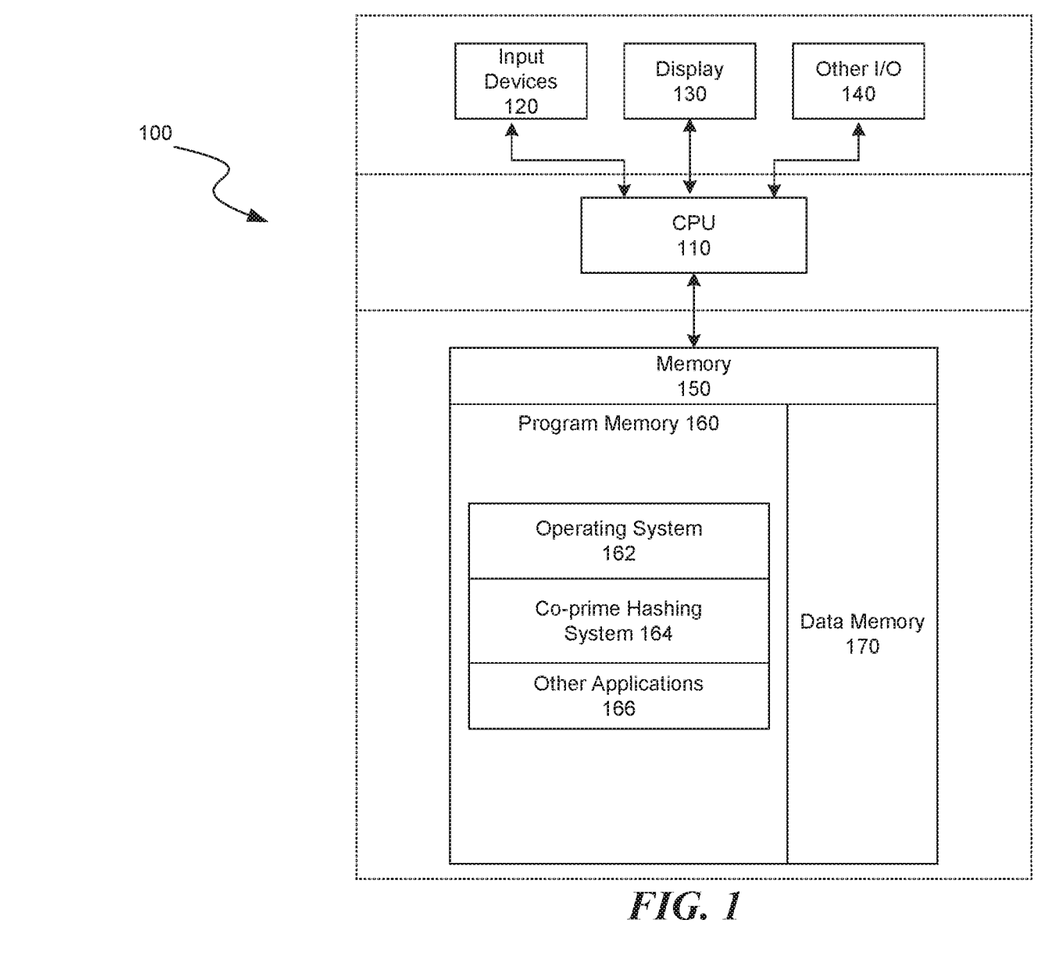
FIG. 1 is a block diagram illustrating an overview of devices on which some implementations can operate.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that implement co-prime hashing. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, co-prime hashing system 164, and other application programs 166. Memory 150 can also comprise data memory 170 that can include hash tables, co-prime numbers lists, data items, functions and variables for utilizing a co-prime hashing system (such as the Euclidean algorithm, hash table size, co-prime numbers list size, hash keys, index counters, probe offset values, hash functions, etc.), configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
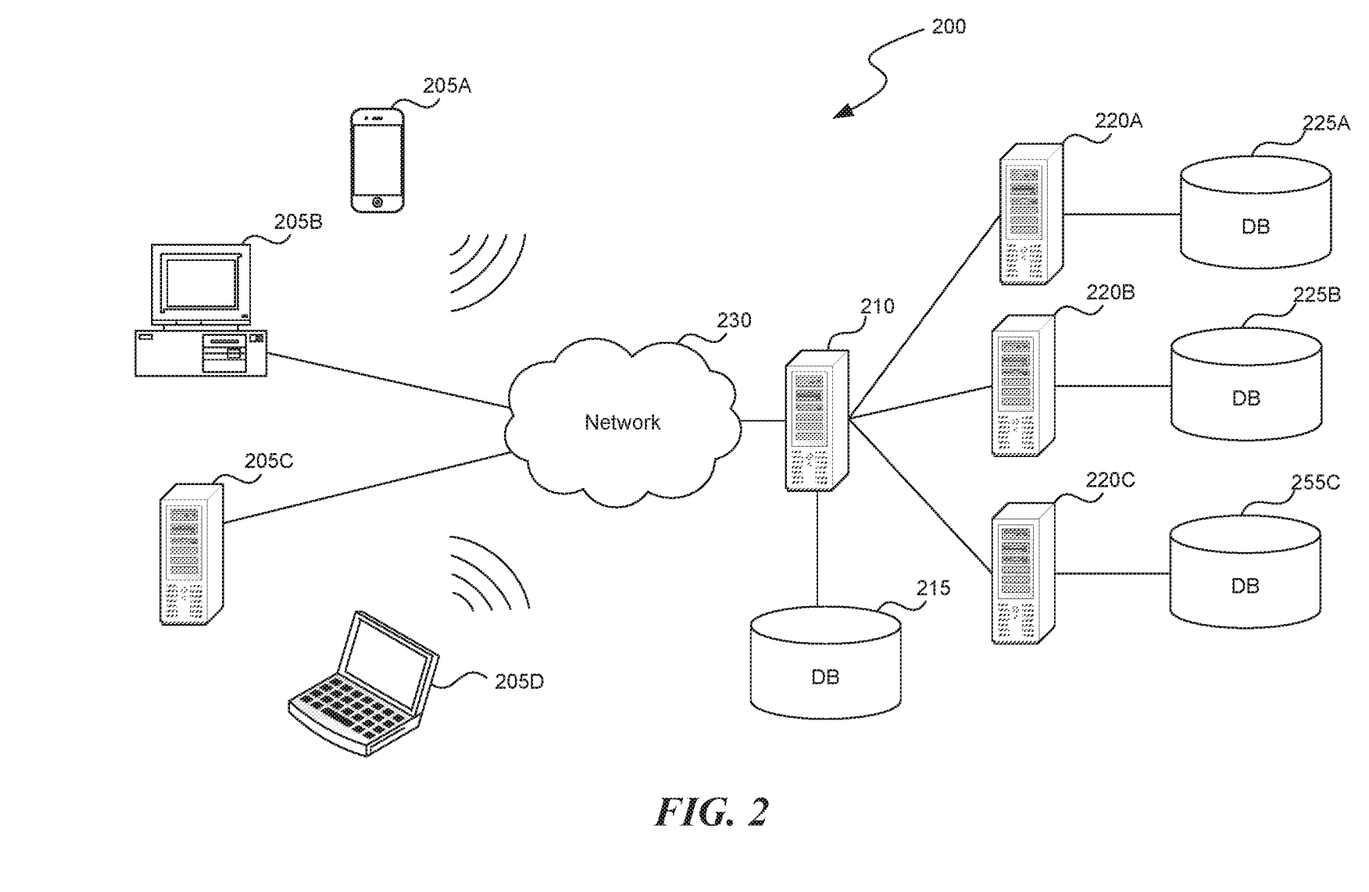
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as hash tables, co-prime numbers lists, data items, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
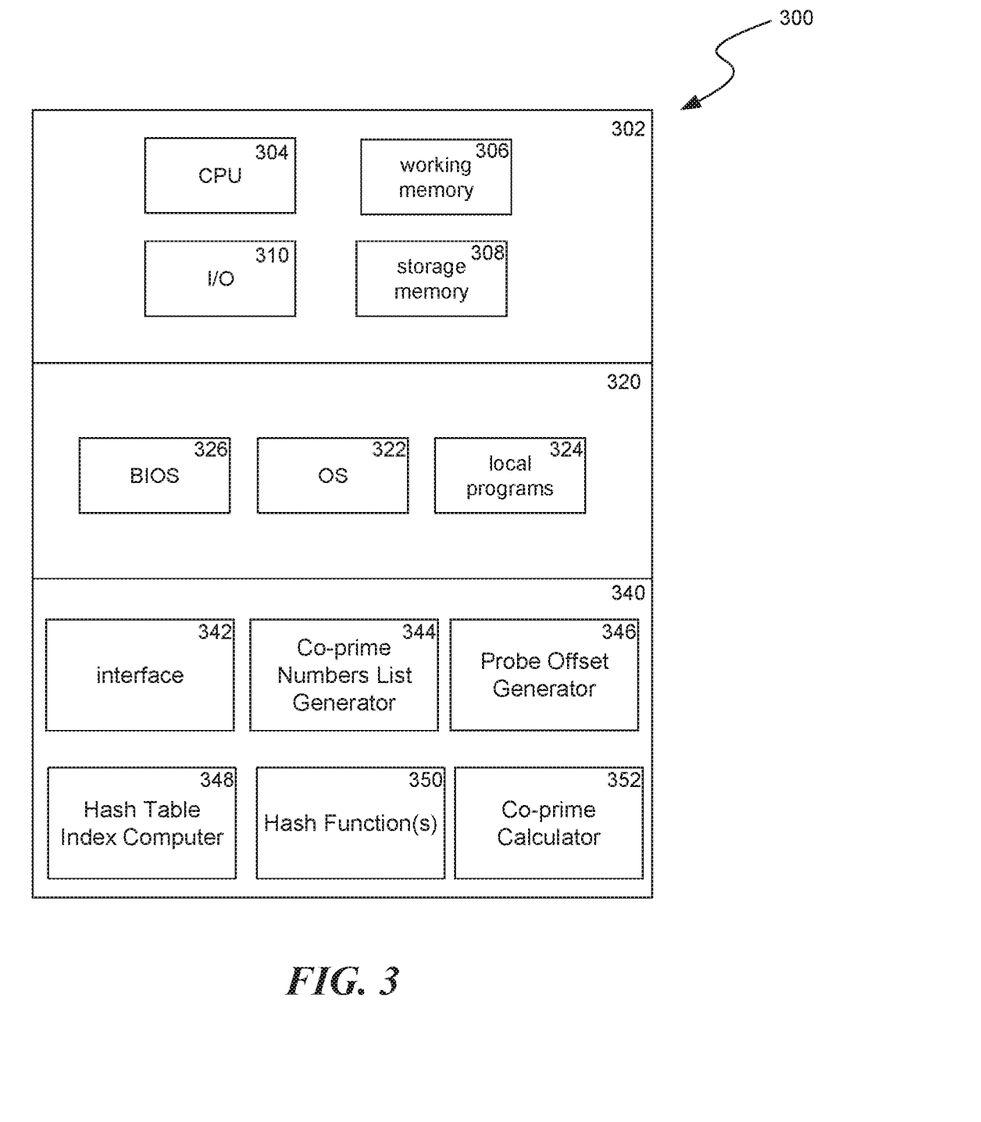
FIG. 3 is a block diagram illustrating components which can be used in a system for some implementations.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include co-prime numbers list generator 344, probe offset generator 346, hash table index computer 348, hash function(s) 350, co-prime calculator 352, and components which can be used for transferring data and controlling the specialized components, such as interface 342. In some implementations, components 300 can be in a computing system that is distributed across multiple computing devices or can include an interface to a server-based application.

Co-prime numbers list generator 344 can be configured to receive a size of a hash table and generate a list of numbers that are co-prime to the size of the hash table. The co-prime numbers list generator can use the co-prime calculator 352 to generate individual co-prime numbers. In various implementations, the co-prime numbers list generator 344 can determine how many co-prime numbers to put on the generated list based on the size of the hash table, using a default size, by selecting all numbers that are co-prime to the hash table size, or based on a measure of current processing load. In various implementations, the co-prime numbers list generator 344 can select co-prime numbers for the generated co-prime numbers list that are as close to evenly spaced as possible, that are the highest co-prime values, that are the lowest co-prime values, or by whichever co-prime values are returned first from the co-prime calculator 352 (e.g. whichever co-prime numbers are quickest to compute). In various implementations, the numbers on the co-prime numbers list can be organized in value order, in a manner to distribute different values across the list, randomly, etc.

Probe offset generator 346 can be configured to receive a co-prime numbers list and a data item key and compute a corresponding probe offset for resolving collisions. Probe offset generator can apply a hash function, of hash functions 350, to the received data item key and compute a modulus of the result with respect to a size of the received co-prime numbers list. Probe offset generator 346 can use the result of this modulus function as an index into the received co-prime numbers list. Probe offset generator 346 can return, as a probe offset, the co-prime number that is at this computed index.

Hash table index computer 348 can be configured to compute a hash table index for a received key. The hash table index can be computed by applying a hash function, from hash functions 350, to the received key and calculating the modulus of the result with respect to the size of the hash table (e.g. hash(key) modulus table_size). When a collision occurs at the computed hash table index because the index is full for an insert operation or because the index does not contain the data item to be retrieved in a retrieval operation, the hash table index computer 348 can be further configured to iteratively compute next hash table indexes until an open slot is located or the table is determined to be full in an insert operation or until the data item is located or determined not to be in the table during a retrieval operation. Each next index can be computed by obtaining a probe offset for the data item from probe offset generator 346 and computing the next index as: (the initial index plus the obtained probe offset) modulus the size of the hash table.

Hash functions 350 can be various functions that map data to a fixed sized result. Examples of hash functions 350 can include MD5, Pearson, Jenkins, Snefru, GOST, or others.

Co-prime calculator 352 can be configured to receive a number and compute one or more numbers that are co-prime to the received number. In some implementations, co-prime calculator 352 can use the Euclidean algorithm to compute co-prime numbers.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
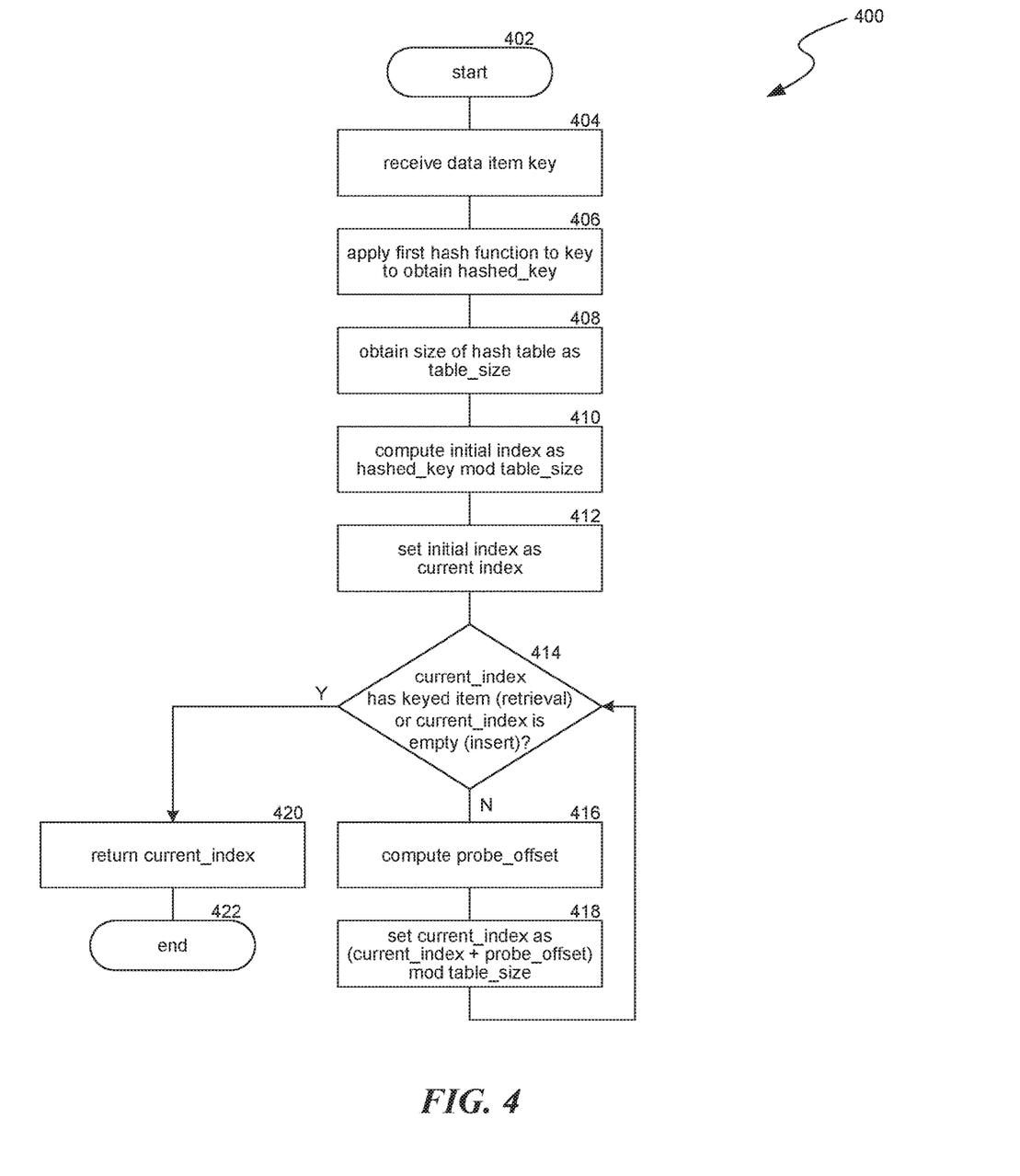
FIG. 4 is a flow diagram illustrating a process used in some implementations for identifying a hash table index for a data item.

FIG. 4 is a flow diagram illustrating a process 400 used in some implementations for identifying a hash table index for a data item. Process 400 begins at block 402 and continues to block 404. At block 404, process 400 can receive a data item key. A data item key, for example, can be a word, number, or other identifier corresponding to a data item.

At block 406, process 400 can apply a first hash function to the data item key received at block 404. This first hash function can compute an initial hashed value for the data item key received at block 404, referred to herein as a "hashed_key" for the data item. In some implementations, the first hash function can be an MD5 function. At block 408, process 400 can obtain a size of the hash table, referred to herein as a "table_size." At block 410, process 400 can compute an initial hash table index for the data item by computing hashed_key modulus table_size. This modulus operation ensures that the computed initial hash table index is not larger than the size of the hash table. At block 412, process 400 can set the initial hash table index computed at block 410 as a current index, referred to herein as a "current_index." Reference to variable terms such as hashed_key and table_size are used herein to refer to any way of using or storing a data value, without, for example, limiting the technology to any particular variable names, storage type, or memory type.

In the loop between the blocks 414 and 418, process 400 can determine if the current_index is the index to be used for insertion or retrieval of the data item, and if not, increment the current_index with a probe offset until the index to be used for the data item is selected. During a retrieval operation, at block 414, process 400 can determine if the current_index of the hash table has the data item. During an insertion operation, at block 414, process 400 can determine if the current_index of the hash table is empty. If so, process 400 continues to block 420. If not, process 400 continues to block 416.

In some implementations, at block 414, process 400 can also determine whether all of the hash table indexes have been checked by the loop between the blocks 414 and 418. If so, during an insertion operation, and no open slots have been found, the hash table is full and alternate processing may be required, such as providing notification that no space is available or creating a larger hash table and reinserting all the items from the current hash table. If process 400 determines that all of the hash table indexes have been checked during a retrieval operation, this can indicate that the data item is not in the hash table and alternate processing, such as a notification that the data item cannot be found, can be performed. In some implementations, other stopping conditions can be used such as performing either of these checks at the beginning of the loop between the blocks 414 and 418 or the loop between the blocks 414 and 418 can be exited before all the hash slots are checked. For example, during an insertion a percentage of the hash table slots can be checked for an open slot or a threshold number of slots can be checked before exiting the loop in favor of creating a larger hash table.

At block 416, process 400 can compute a probe offset for the data item, referred to herein as a "probe_offset." Computing a probe offset can comprise applying a second hash function to the keys obtained at block 404 and using the results of the second hash function to select a number that is co-prime to the size of the hash table from a co-prime number list. Additional details regarding computing a probe_offset are provided below in relation to FIG. 5.

At block 418, the current_index can be updated by (A) adding to the current_index the probe_offset computed at block 416 and (B) calculating a modulus of the result of the addition with respect to the table_size obtained at block 408. This procedure successively increments the current_index and uses the modulus operation to keep the results within the size of the hash table.

When the loop between the blocks 414 and 418 concludes, e.g., when an open slot for an insertion is found or when the data item of a retrieval is found, process 400 continues to block 420. At block 420, process 400 can return the current_index, an indication that the hash table is full, or an indication the data item cannot be found in the hash table. The current_index can be used to insert a data item during the insertion operation or to retrieve the data item during a retrieval operation. Process 400 then continues to block 422 where it ends.

Figure 5:
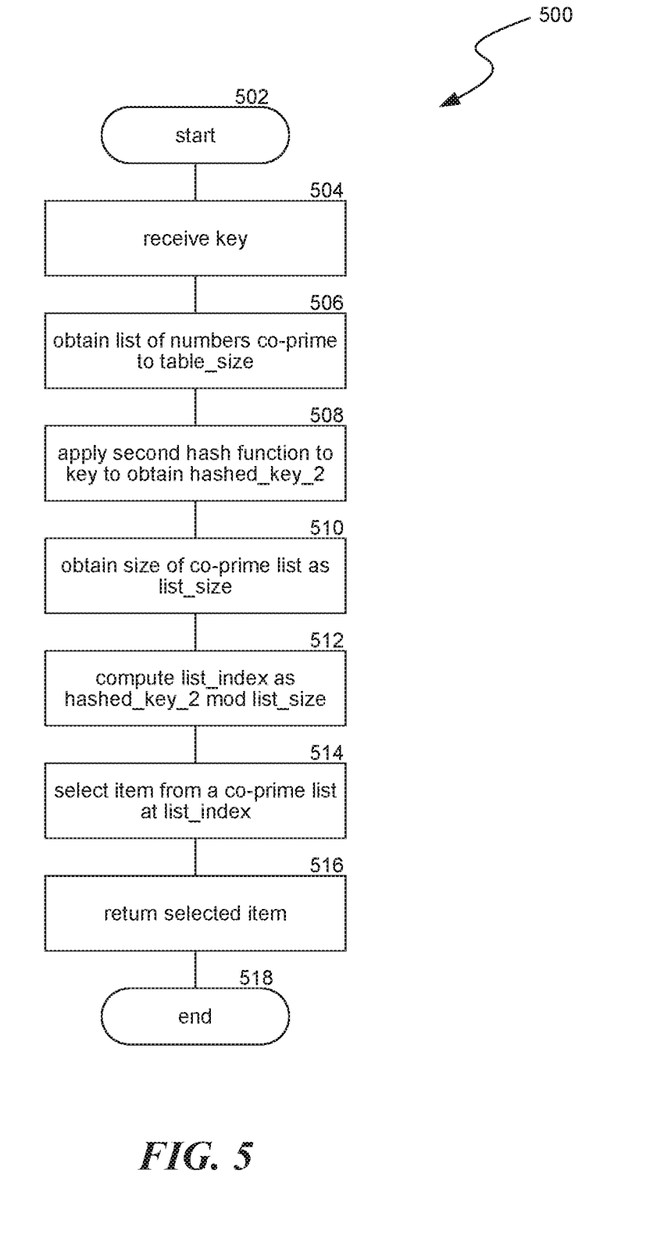
FIG. 5 is a flow diagram illustrating a process used in some implementations for computing a probe offset for a collision involving a data item.

FIG. 5 is a flow diagram illustrating a process 500 used in some implementations for computing a probe offset for a collision involving a data item. Process 500 begins at block 502 and continues to block 504. At block 504, process 500 can receive a data item key. In some implementations, where process 500 is called from block 416 of process 400, the data item key received at block 504 can be the data item key received at block 404.

At block 506, process 500 can obtain a list of numbers co-prime to a size of a hash table. The list of co-prime numbers can be generated using the Euclidean algorithm. Additional details regarding generating a list of co-prime numbers are provided below in relation to FIG. 6.

At block 508, process 500 can apply a second hash function to the key received at block 504. The results of the second hash function are referred to herein as a "hashed_key_2." In some implementations, the second hash function can be an MD5 hash function. In some implementations where process 500 is called from block 416 of process 400, the second hash function can be a portion of the hash function used at block 406. For example, the first hash function of block 406 can use the first half of an MD5 hash function while the second hash function of block 508 can use the second half of the same MD5 hash function.

At block 510, process 500 can obtain a count of a number of items in the list of co-prime numbers obtained at block 506, referred to herein as a "list_size." In some implementations, list_size can be the size of a list of co-prime numbers selected at block 606, discussed below. At block 512, process 500 can compute an index into the list of co-prime numbers by calculating hashed_key_2 modulus list_size. A result of this modulus operation is referred to herein as a "list_index." At block 514, process 500 can select the co-prime number from the list of co-prime numbers obtained at block 506 that is at an index corresponding to the list_index. At block 516, process 500 can return the co-prime number selected at block 514. Process 500 can then continue to block 518, where it ends.

Figure 6:
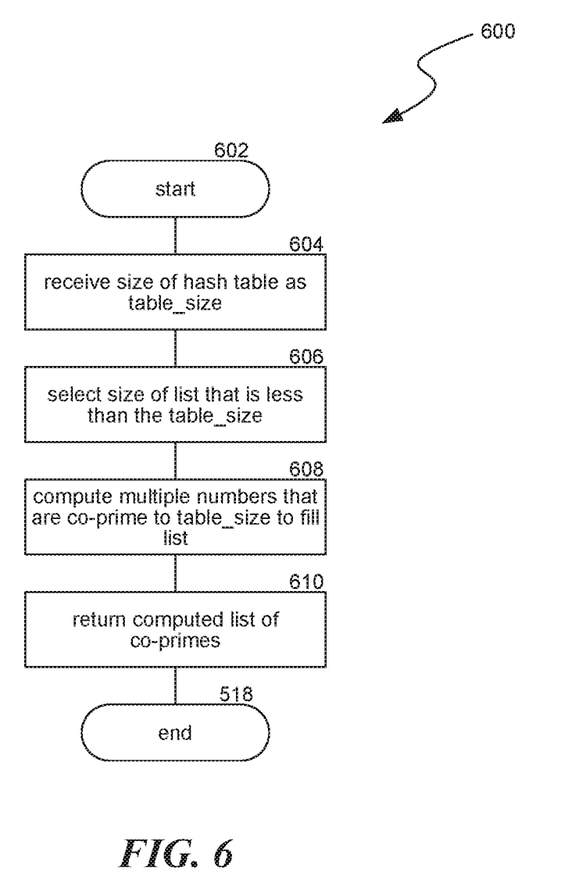
FIG. 6 is a flow diagram illustrating a process used in some implementations for generating a co-prime numbers list.

FIG. 6 is a flow diagram illustrating a process 600 used in some implementations for generating a co-prime numbers list. Process 600 begins at block 602 and continues to block 604. At block 604, process 600 can receive a size of a hash table, e.g. table_size defined above. In some implementations where process 600 is establishing a co-prime numbers list which will be used in processes 400 and 500, table_size can be the same table_size obtained at block 408 and used an block 506.

At block 606, process 600 can select a size for the co-prime numbers list that is being created. In some implementations, the size selected at block 606 will be less than or equal to table_size. In some implementations, the size at block 606 can be optimized for a hash table of table_size. For example, a function can be generated, based on observed performances of hash tables using a co-prime hashing system, that takes a size of a hash table as a parameter and outputs a size of a co-prime numbers list that is expected to have the best performance.

At block 608, process 600 can compute multiple numbers that are co-prime to table_size. Process 600 can compute enough co-prime numbers to fill a list of the size selected at block 606. In some instances, there may not be enough numbers that are co-prime to table_size to fill a list of the size selected at block 606. In these instances, the list size can be reduced until it is small enough that it can be filled by the numbers that are co-prime to table_size. In some implementations, co-prime numbers can be computed by applying the Euclidean algorithm. In various implementations where not all of the numbers that are co-prime to table_size are selected to be included in the list, the co-prime numbers that are included in the list can be: the highest co-prime numbers, the lowest co-prime numbers, co-prime numbers that are evenly spaced across the lists of co-prime numbers, a random selection of co-prime numbers, or selected based on other selection criteria. At block 610, process 600 can return the list of co-prime numbers computed at block 608. Process 600 can then continue to block 612, where it ends.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for inserting a data item into a hash table, comprising:
   receiving a key for the data item;
   applying a first hash function to the key to obtain a hashed key;
   obtaining a size of the hash table as table size;
   computing an initial index into the hash table by computing hashed key modulus table size;
   determining that a collision occurred at the initial index by determining: for an insert operation, that a slot corresponding to the initial index in the hash table is not available, or, for a retrieval operation, that the data item does not exist at the slot corresponding to the initial index in the hash table;
   computing a next index by:
     obtaining a list of numbers that are co-prime to table size;
     obtaining a size of the list of numbers as list size;
     applying a second hash function to the key to obtain hashed_key_2;
     selecting a co-prime number from the list of numbers at a location on the list of numbers corresponding to: hashed_key_2 modulus list size, the selected co-prime number representing a probe offset value for the data item, each data item having a different probe offset value; and
     computing the next index as: (the initial index plus the selected co-prime number) modulus table size; and
   inserting the data item into the hash table at the computed next index, wherein the inserting includes:
     attempting to insert the data item in at least a minimum number of separate hash table slots;
     determining whether a collision occurs at each insertion attempt, and
     when a collision occurs, preventing creation of a larger hash table until the data item has been inserted in at least the minimum number of separate hash table slots.

2. The method of claim 1 wherein at least one number on the list of numbers is computed by applying the Euclidean algorithm.

3. The method of claim 1 wherein an amount of numbers on the list of number is based on the size of the hash table.

4. The method of claim 1 wherein an amount of numbers on the list of number is based on one or more of:
   a default size;
   all numbers that are co-prime to the size of the hash table;
   a measure of a current processing load; or
   any combination thereof.

5. The method of claim 1 wherein the numbers on the list of number are selected by one or more of:
   selecting co-prime numbers that are as close to evenly spaced as possible;
   selecting co-prime numbers that are the highest values that are co-prime to the size of the hash table;
   selecting co-prime numbers that are the lowest values that are co-prime to the size of the hash table; or
   any combination thereof.

6. The method of claim 1 wherein the first hash function and/or the second hash function is an MD5 hash function.

7. The method of claim 1 wherein the first hash function is a first part of an established hash function and the second hash function is a second part of the established hash function different from the first part of the established hash function.

8. The method of claim 1 further comprising, prior to inserting the data item into the hash table, determining that there is a second collision at the next index and, in response, updating the next index by:
  adding the selected co-prime number to the next index and calculating a modulus of the result with respect to table size.

9. A computer-readable storage medium storing instructions that, when executed by a computing system, cause the computing system to perform operations for retrieving a data item from a hash table, the operations comprising:
  receiving a key for the data item;
  applying a first hash function to the key to obtain a first hashed key;
  computing an initial index into the hash table based on the first hash key;
  determining that the data item is not at the initial index in the hash table;
  computing a next index by:
    obtaining a list of numbers that are each co-prime to a size of the hash table;
    applying a second hash function to the key to obtain a second hash key;
    selecting a co-prime number from the list of numbers at a location on the list that is based on the second hashed key, the selected co-prime number representing a probe offset value for the data item, each data item having a different probe offset value; and
    computing the next index based on a combination of the initial index and the selected co-prime number; and
  retrieving the data item from the hash table at the next index;
    wherein retrieving the data item from the computed next index includes attempting data item retrieval from at least a minimum number of hash table slots, and
    wherein retrieving the data item from the computed next index avoids looping back to an initial index and further prevents creation of a larger hash table without first attempting data item retrieval from at least the minimum number of separate hash table slots.

10. The computer-readable storage medium of claim 9 wherein computing the initial index into the hash table based on the first hash key comprises calculating a modulus of the first hash key with respect to a number of slots in the hash table.

11. The computer-readable storage medium of claim 9 wherein computing the next index based on the combination of the initial index and the selected co-prime number comprises:
  computing a sum of the initial index and the selected co-prime number; and
  computing the next index as the sum modulus a number of slots in the hash table.

12. The computer-readable storage medium of claim 9 wherein selecting the co-prime number from the list of numbers comprises calculating a modulus of the second hash key with respect to a count of the number on the list of numbers.

13. The computer-readable storage medium of claim 9 wherein at least one number on the list of numbers is computed by applying the Euclidean algorithm.

14. The computer-readable storage medium of claim 9 wherein an amount of numbers on the list of number is based on one or more of:
  a default size;
  a number of slots in the hash table;
  all numbers that are co-prime to the size of the hash table; or
  any combination thereof.

15. The computer-readable storage medium of claim 9 wherein the numbers on the list of number are selected by computing co-prime numbers that are the highest values that are co-prime to the size of the hash table.

16. The computer-readable storage medium of claim 9 further comprising prior to retrieving the data item from the hash table, determining that the data item is not at the next index and, in response, updating the next index by adding a multiple of the selected co-prime number to the next index.

17. The computer-readable storage medium of claim 9 further comprising determining that the data item is not at the next index and, in response, updating the next index by:
  computing a sum of a multiple of the selected co-prime number and the next index; and
  modifying the next index to be the sum modulus a number of slots in the hash table.

18. A system for initiating a hash table, comprising:
  a memory;
  one or more processors; and
  a co-prime numbers list generator configured to generate a set of co-prime numbers that are each co-prime to a number of slots in a hash table;
  wherein a hash table index computer is configured to compute an index into the hash table for a data item key after a collision occurs at an initial index by:
  computing, with a probe offset generator, a probe offset by:
    obtaining the set of co-prime numbers;
    applying a hash function to the data item key to obtain a hashed key; and
    selecting a co-prime number from the set of co-prime numbers at a location in the set of co-prime numbers that is based on the hashed key, the selected co-prime number representing a probe offset value for the data item, each data item having a different probe offset value;
  computing the index into the hash table based on a combination of the initial index and the probe offset; and
  inserting the data item into the hash table at the computed next index, wherein the inserting includes:
    attempting to insert the data item in at least a minimum number of separate hash table slots;
    determining whether a collision occurs at each insertion attempt, and
    when a collision occurs, preventing creation of a larger hash table until the data item has been inserted in at least the minimum number of separate hash table slots.

19. The system of claim 18,
  wherein the probe offset generator is configured to select the co-prime number from the set of co-prime numbers by computing a modulus of the hashed key with respect to a count of co-prime numbers in the set of co-prime numbers; and
  wherein the hash table index computer is configured to compute the index into the hash table by computing:
    a sum of the initial index and the probe offset; and
    a modulus of the sum with respect to a number of slots in the hash table.

20. The system of claim 18 further comprising:
determining that a collision occurred at the index into the hash table by determining:
for an insert operation, that a slot corresponding to the index into the hash table is not available, or, for a retrieval operation, that the data item does not exist at the slot corresponding to the index into the hash table; and
in response, updating the index into the hash table by adding a multiple of the selected co-prime number to the index into the hash table.

* * * * *